(12) United States Patent
Rátai

(10) Patent No.: US 9,029,746 B2
(45) Date of Patent: May 12, 2015

(54) OPTICAL SENSOR

(75) Inventor: Dániel Rátai, Budapest (HU)

(73) Assignee: Leonar3Do International Zrt., Etyek (HU)

( * ) Notice: Subject to any disclaimer, the term of this patent is extended or adjusted under 35 U.S.C. 154(b) by 914 days.

(21) Appl. No.: 13/640,096

(22) PCT Filed: Feb. 23, 2010

(86) PCT No.: PCT/HU2010/000020
§ 371 (c)(1),
(2), (4) Date: Oct. 9, 2012

(87) PCT Pub. No.: WO2010/100511
PCT Pub. Date: Sep. 10, 2010

(65) Prior Publication Data
US 2013/0082168 A1  Apr. 4, 2013

(30) Foreign Application Priority Data
Feb. 24, 2009 (HU) .................. 0900110

(51) Int. Cl.
*G01J 1/20* (2006.01)
*G01J 1/04* (2006.01)
(Continued)

(52) U.S. Cl.
CPC ............. *G01J 1/0462* (2013.01); *G01S 3/7835* (2013.01); *G01S 3/784* (2013.01); *G06F 3/0304* (2013.01)

(58) Field of Classification Search
CPC ........................ G01D 5/244; G01D 5/34715
USPC .............. 250/203.4, 231.13–231.18
See application file for complete search history.

(56) References Cited

U.S. PATENT DOCUMENTS

| 4,694,149 A | 9/1987 | Toyama |
| 4,999,483 A * | 3/1991 | Okamoto .................. 250/203.1 |
| 2003/0155510 A1* | 8/2003 | Dean et al. .................... 250/332 |

FOREIGN PATENT DOCUMENTS

| DE | 202006005876 | 8/2007 |
| EP | 0612185 | 8/1994 |

(Continued)

OTHER PUBLICATIONS

European Patent Office, International Search Report (3 pgs.), May 17, 2011, Written Opinion of the International Searching Authority (5 pgs.).

(Continued)

*Primary Examiner* — Tony Ko
(74) *Attorney, Agent, or Firm* — Wood, Herron & Evans, LLP

(57) ABSTRACT

An optical sensor for use in a placement detection system includes a pixel line defined by pixels, and an optical imaging means imaging the light of the light source onto a light strip being cross-directional to the detection line of the line-sensor. The optical imaging means is arranged with a distance from the line-sensor, so that the light strip has strip-boundary transitions on each of two edges in the direction of the detection line. The detection line includes a pixel line, in which there are gaps between the adjacent pixels, and the optical imaging means either increases the dimension of the strip-boundary transitions in the direction of the detection line, or creates at least four strip-boundary transitions along the detection line to ensure that at least one of the strip-boundary transitions always falls at least in part onto a pixel.

15 Claims, 4 Drawing Sheets

(51) Int. Cl.
*G01S 3/783* (2006.01)
*G01S 3/784* (2006.01)
*G06F 3/03* (2006.01)

(56) References Cited

FOREIGN PATENT DOCUMENTS

| EP | 1845334 | 10/2007 |
|---|---|---|
| JP | 61137115 | 6/1986 |
| JP | 03293618 | 12/1991 |
| JP | 063000624 | 10/1994 |
| JP | 08313209 | 11/1996 |
| JP | 2009037620 | 2/2009 |

OTHER PUBLICATIONS

Japanese Patent Office, Office Action of Corresponding Japanese Application, (English language translation, 4 pgs.), (Japanese, 5 pgs.), Oct. 8, 2013.
English language translation of JP H06-300624, Hollandse Signaalapparaten BV, Oct. 28, 1994.
English language translation of JP08313209, Sefuto Kenkyusho KK, Nov. 29, 1996.
English language translation of JP2009-037620, Unique Instruments CO LTD, Feb. 19, 2009.

* cited by examiner

OPTICAL SENSOR

CROSS-REFERENCE TO RELATED APPLICATIONS

This application claims priority, under Section 371, to PCT Application No. PCT/HU2010/000020, filed on Sep. 23, 2010, which claims priority to Hungary Application No. P 0900110, filed on Feb. 24, 2009.

TECHNICAL FIELD

The present invention relates to an optical sensor for a placement detection system.

BACKGROUND ART

Various solutions are used in the present technical field for determining the placement, arrangement of an object or signal/signal source (according to the invention, placement shall mean one-, two- or three-dimensional position and/or orientation). Determination and tracking of spatial position is a task of high significance in various fields (e.g. virtual reality devices, motion capture, robotics, manufacturing technology).

Optical position determination devices generally comprise a signal source (transmitter), a sensor (receiver) and a computer control unit. The transmitters are usually LEDs, lasers or light-reflecting elements, while the receivers are cameras, line-sensors or photodiode/phototransistor arrangements. When using line-sensors, i.e. sensors comprising one-dimensionally arranged light detectors, the data processing unit is required to process significantly less amount of data, therefore, it has a lower memory and computer capacity demand. Line-sensors are generally produced in the form of ICs. Line-sensors constrain the possible positions of a light source onto one plane, therefore, in a general case at least three of these are required for detecting the spatial position of the light source (two planes intersect each other in one line, while three planes intersect each other in one point). The number of signal sources and sensors is chosen depending on the given application, e.g. in case of a one-dimensional position determination, one signal source and one sensor could be sufficient.

Such an exemplary line-detecting optical sensor, known from WO 2010/013079 A1 is depicted in FIG. 1. The optical sensor comprises a line-sensor 16 suitable for detecting a signal emitted by a light source 11 and—arranged with a distance from the line-sensor 16—an optical imaging means 17, preferably a slot, or a cylindrical lens optically identical therewith, arranged cross-directionally to a detection line of the line-sensor 16. The light exiting light source 11 forms a strip of light through the slot onto the line-sensor 16, the detection of which by the line-sensor 16 provides data regarding the spatial placement of the light source 11. The optical sensor therefore constrains the possible positions of signal source 11 onto one (planar or curved) surface. Line-sensors 16 generally comprise pixel lines made up of light sensing pixels.

FIG. 2 illustrates the disadvantageous impacts of gaps being in line-sensors according to the prior art technology. Pixel line 20 illustrated in the lower part of the FIG. comprises square pixels 21, amongst which, due to the manufacturing technology, there are gaps also square in form. The lower the resolution, i.e. the cheaper the line-sensor is, the higher is the gap rate as compared to the width of the projected light strip.

In general, line-sensors 16 are commercially available in the form of ICs, by way of example, let us examine a cheap 64-pixel type. In this type, the width of one pixel is approx. 60 µm, with a gap width of approx. 40 µm, and having a pixel 21 height of approx. 125 µm. In a way as illustrated in FIG. 1, a light strip 22 is projected through the slot onto the pixel line 20 illustrated in the lower part of the figure, and the data relating to the spatial position of the light source 11 can be determined from the position of the light strip 22. The light strip 22 shown in FIG. 2 is represented with continuous line; while a light strip offset to the right is also represented in the figure with dashed lines. It is apparent that light strip 22 represented by continuous line covers 3 pixels and 2 gaps, while the offset light strip represented by dashed lines cover 2 pixels and 3 gaps. Accordingly, the sensing curve of the line-sensor 16 illustrated in the upper part of FIG. 2 takes up an irregular, wave-like form. This irregular, wave-like form of the sensing curve is extremely disadvantageous in terms of determining the spatial position, as it greatly degrades the accuracy of position detection.

There is another factor in addition to the above irregularity that can render the detection indefinite. If the edges of the light strip 22 fell onto gaps, the line-sensor 16 would render identical output signal to any light strip position within the range defined by the gaps.

FIG. 3 shows various cross-directional light strip light distribution curves occurring in systems used for detecting spatial position in the technical field of the invention. The light strip 22 comprises a range of essentially 100% light intensity, and on each of its two sides there is a strip-boundary transition 23 ranging from the essentially 100% illumination power to a 0% illumination power (i.e. a power not detected by the pixels 21). The light distribution curve of light strip 22 is dependent upon a number of factors, nevertheless, smaller or larger size strip-boundary transitions 23 appear on both sides of the light strip 22 in the case of each and every light distribution. If at the optical sensor a light strip position can occur, when all strip-boundary transitions 23 fall entirely onto gaps, then the above mentioned uncertain position would arise, rendering the position detection indefinite. In the graph of FIG. 2 these indefinite ranges are represented by the horizontal sections of the wave-like curve.

It is, therefore, the disadvantage of known line-detecting optical sensors—especially those with low resolution and low pixel number—that the gaps between the pixels in a pixel line—being present due to the manufacturing technology—render the detected signal uneven, indefinite and irregular, depending on the position of the light strip.

SUMMARY

According to the invention it has been recognized, that the aforementioned indefinite position may be eliminated by way of ensuring that at least one part of at least one of the strip-boundary transitions 23 fall upon a pixel 21 at all times. In this way no such case may occur, where identical output signals were rendered by the line-sensor 16 to more than one light strip position. Having met the condition as per the present invention, the output signal of the line-sensor 16 will represent a manageable, deterministic, and a more even (smoothed) function.

It is an object of the invention to provide an optical sensor, which is exempt of problems of the prior art. It is also an object of the invention to provide an accurate and deterministic optical sensing by means of inexpensive and low resolution, i.e. low pixel number line-sensors. Yet a further object of the invention is to achieve the above objects in a simple and low cost way.

The objects according to the invention can be achieved by the optical sensor described below. Preferred embodiments of the invention are specified below as well.

In accordance with the invention, various solutions have been provided for making the indefinite, irregular sensing curve of the optical sensor regular, preferably smoothing it or making it more linear.

BRIEF DESCRIPTION OF DRAWINGS

Exemplary preferred embodiments of the invention are hereunder described in reference to drawings, where.

DETAILED DESCRIPTION

Figure 1:
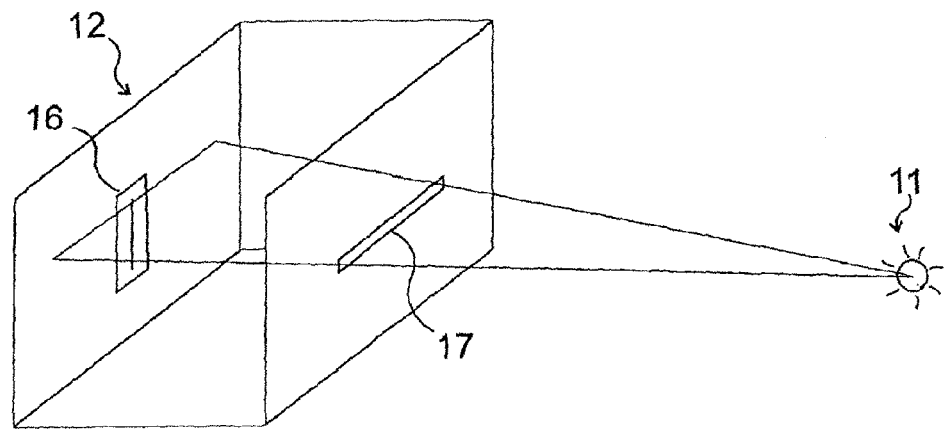
FIG. 1 is a schematic view of a detail of a prior art system used for determining spatial placement.
Figure 2:
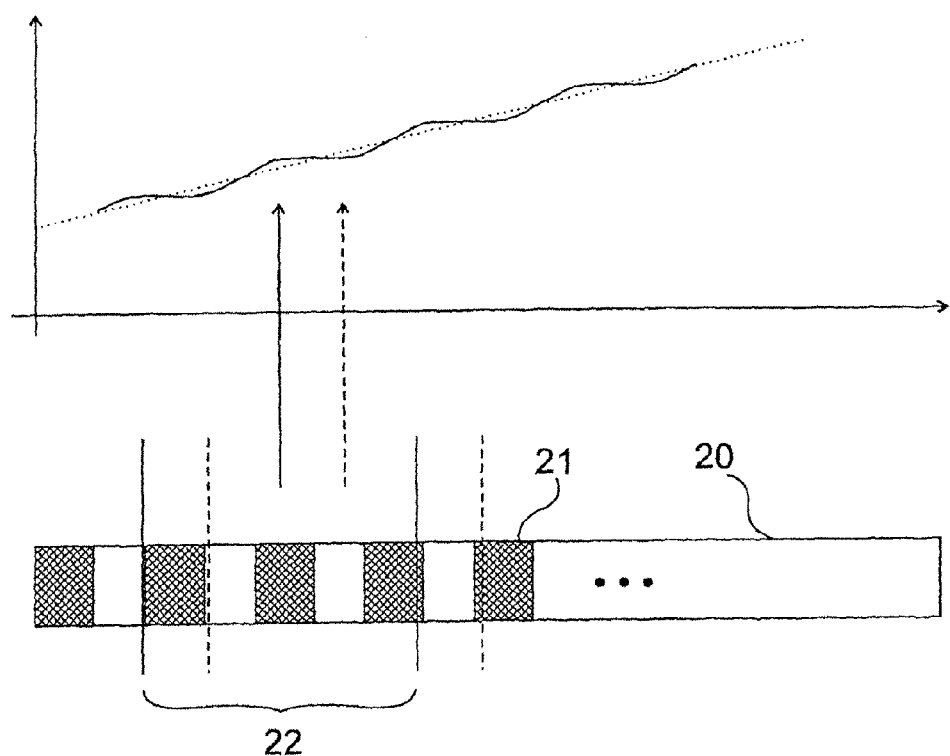
FIG. 2 is a schematic diagram demonstrating the impact of inter-pixel gaps.

Exemplary preferred embodiments of the present invention will be described hereunder for a case of optical position determination, where the signal sources are light sources, preferably LEDs.

Thus, the inventive optical sensor is used for detecting a signal emitted by a light source 11, and the optical sensor comprises
- a line-sensor 16 having a detection line comprising a pixel line 20 consisting of pixels 21, and
- an optical imaging means 17 imaging the light of the light source 11 onto a light strip 22 being cross-directional to the detection line of the line-sensor 16, the optical imaging means 17 being arranged with a distance from the line-sensor 16, the light strip 22 having strip-boundary transitions 23 on each of its two edges in the direction of the detection line.

The optical sensor according to the invention is applied for such line-sensors 16 that are simple in construction, wherein the detection line comprises a pixel line 20 having gaps between adjacent pixels 21. According to the invention, the optical sensor has a detection range ensuring that at least one of the strip-boundary transitions 23 always falls at least in part onto a pixel 21.

By fulfilling the above criterion, the detection uncertainties will be eliminated and the position of the light strip 22 can be clearly determined based on the line-sensor 16 output. In this way, the cheapest possible line-sensors 16 will be enabled to render high accuracy detection.

It is one important basic idea of the present invention, that the extent of dimension (size) of the strip-boundary transitions 23 are to be increased as compared to the dimension of the detection line. This can be implemented in various ways.

An especially preferred embodiment of the present invention comprises an optical imaging means 17 performing an increase of the dimension of strip-boundary transitions 23 along the detection line. By means of such increase of the strip-boundary transitions 23 the criterion according to the present invention can be met in a relatively simple and efficient manner.

The increase of the dimension of strip-boundary transitions 23 along the detection line is achieved in one especially preferred embodiment by having the optical imaging means 17 formed as a slot 17A, the rims 17B of which also comprise a range ensuring intermediate light transmission. Intermediate light transmission range refers to any and all arrangements, wherein the shift between light-blocking and light-transmission on the rim 17B is not immediate and/or is not arranged along a straight line.

It is especially preferred, if the range of the slot rim providing for intermediate-light transmission is formed with a zig-zag rim shape. Such a slot will provide continuous light transmission transition instead of a definite borderline; the slot rims also comprise at least one range ensuring an intermediate light transmission.

Figure 4:
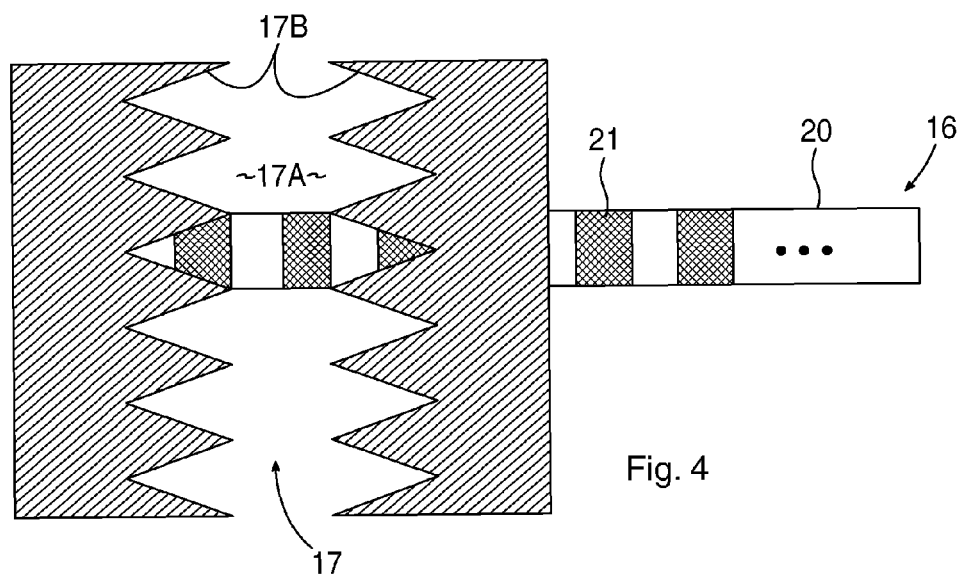
FIG. 4 is a schematic drawing of the operation of a preferred optical sensor.

The period length of the zig-zag shape is preferably adjusted so as to comprise an integer number of period lengths fitting in the height of the pixels 21, i.e. in its dimension perpendicular to the detection line. In this way the detection is not influenced by the position in which the projecting image of the slot according to FIG. 4 projects onto the pixel line 20 in a vertical direction.

Furthermore, the zig-zag shape extends in the direction of the detection line at least over a range identical with the period-distance of the pixels 21. This preferably means that the zig-zag, preferably a sawtooth shape has a depth corresponding at least to the sum of the widths of one pixel and one gap. In this way the distortion effect of the gaps will be equalized and the characteristic sensing curve of the line-sensor 16 will be smoothed to a straight line.

Figure 5:
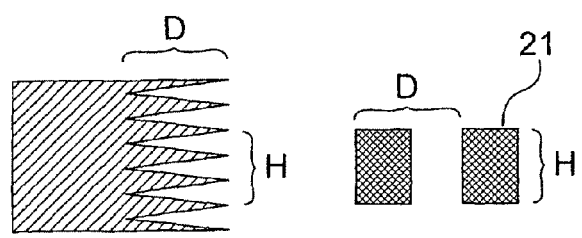
FIG. 5 is an explanatory drawing of the optical sensor according to FIG. 4.

In another preferred embodiment illustrated in FIG. 5, a dimension H of the pixel 21 (e.g., the square pixel height) covers three sawteeth-periods in a direction perpendicular to the detection line. A period D of the pixels 21 (e.g., the width defined by the square pixel and the gap combined) corresponds to the amplitude, i.e. the depth, of the sawtooth.

By means of the above parameters of the zig-zag shape, preferably a sawtooth rim arrangement, it can be achieved for the characteristic sensing curve of the line-sensor 16 to become regular, linear in a direction-independent way. With reference to the above described specific line-sensor 16, H=125 μm and D=100 μm. The number of ridges in the H height in the zig-zag shape are preferably set depending upon the accuracy and the wavelength of the light. A more dense zig-zag shape will provide more accurate result, however, the manufacturing imprecision distort the accuracy of the product. Choice of the parameter of the zig-zag shape, therefore, shall consider the manufacturing precision as well.

According to the present invention, of course, any shape other than a sawtooth may also be applied, if meeting the functional requirements of the invention, or a shapeless graduate shading transition may also be applied. Even in such case, the transition comprises at least one intermediate light transmission range.

Figure 3:
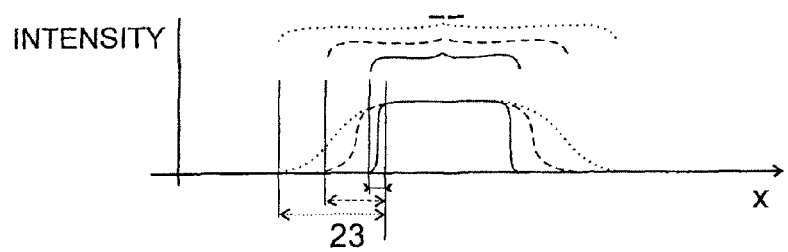
FIG. 3 is a diagram of cross-directional light strip light distributions.
Figure 6:
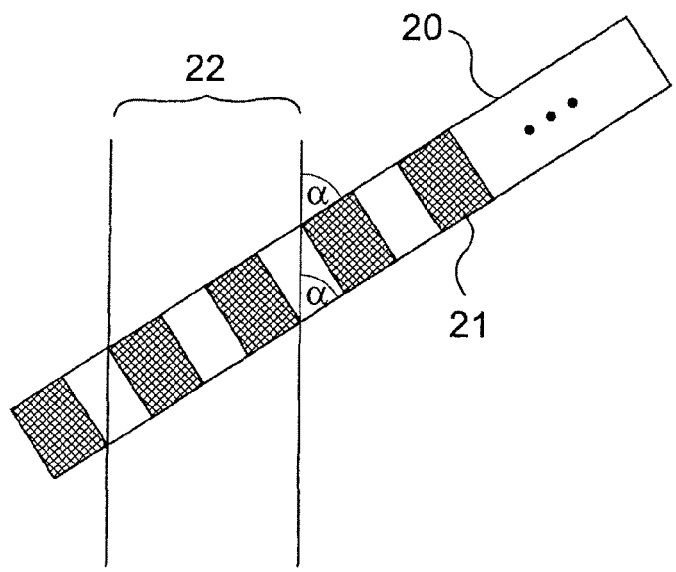
FIG. 6 is a schematic view of a further optical sensor according to the invention.

According to another preferred embodiment, in the way as depicted in FIG. 6, the slot closes an angle other than orthogonal with the detection line; the dimension of the strip-boundary transitions 23 along (i.e. in the direction of) the detection line is increased in this case as well. This a angle preferably is equal or less than the angle closed by the diagonal of the gap and the detection line of the line-sensor 16. Such an angular slot will result the light strip 22 depicted in FIG. 6 nearly equalizing the distortion effect of the gaps. Setting the a angle to this maximum value is preferable, because—as depicted in FIG. 3—in this way the edge of the light strip 22 will not fall onto the pixel line 20 so that the edge of the light strip entirely passes through one gap (the pixels 21 will by all means overlay the edges of the light strip), at the same time very little of the detection resolution is lost. In this way the criterion according to the invention is met even in the case of a minimum dimension strip-boundary transition 23. This solution provides a remarkably simple and low cost smoothing of the characteristic sensing curve of the line-sensor 16. In this solution, however, the slot is to be put nearer to the sensor in order to maintain the same level of space segment covered by the optical sensor, and therefore this solution is more sensitive to manufacturing imprecisions.

Figure 7:
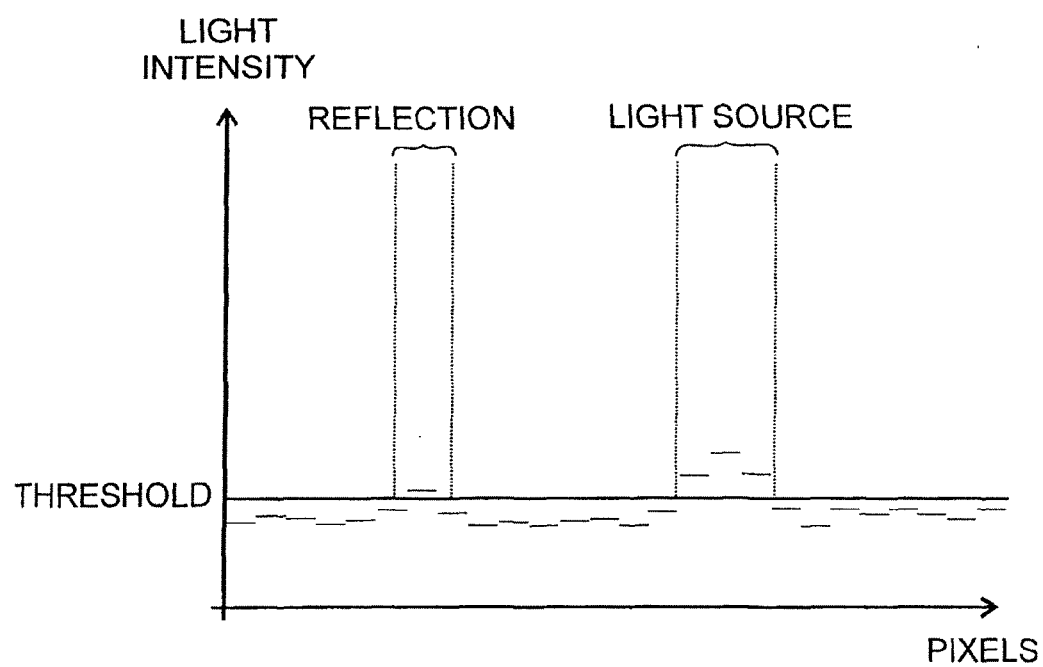
FIG. 7 is a detection diagram of yet another preferred optical sensor according to the invention.

According to the invention, an element comprising a matted light transmitting surface can preferably be placed between the light source 11 and the line-sensor 16, as well. The matted light transmitting surface also equalizes the distortion effect of the gaps, however, it has the additional effect of slightly suppressing the character of sensing; flattening the detection apices. This is especially disadvantageous in reflection filtering, when a smaller or a larger apex is to be decided to belong to either the light source or the reflection. At the same time the distance visible by the optical sensor also reduces. It comes with this solution, that it is relatively hard to achieve a uniform matting not yet reducing illumination power, but already having a linearizing effect. In the case illustrated in FIG. 7, the above-threshold reflection signal levels and the signal levels belonging to the light source are in relative close proximity to each other, hindering reflection filtering. For light scattering purposes not only matting may be applied, but also a cylindrical lens of slight distortion or one focusing before or behind the pixel line may be used. At this time the rate of reflection is relatively well controllable. Its disadvantage is that as opposed to the slot it is harder to manufacture, and it requires more precision for building the element into the system, at the same time incurring more incremental cost and an additional possibility of errors.

Figure 8:
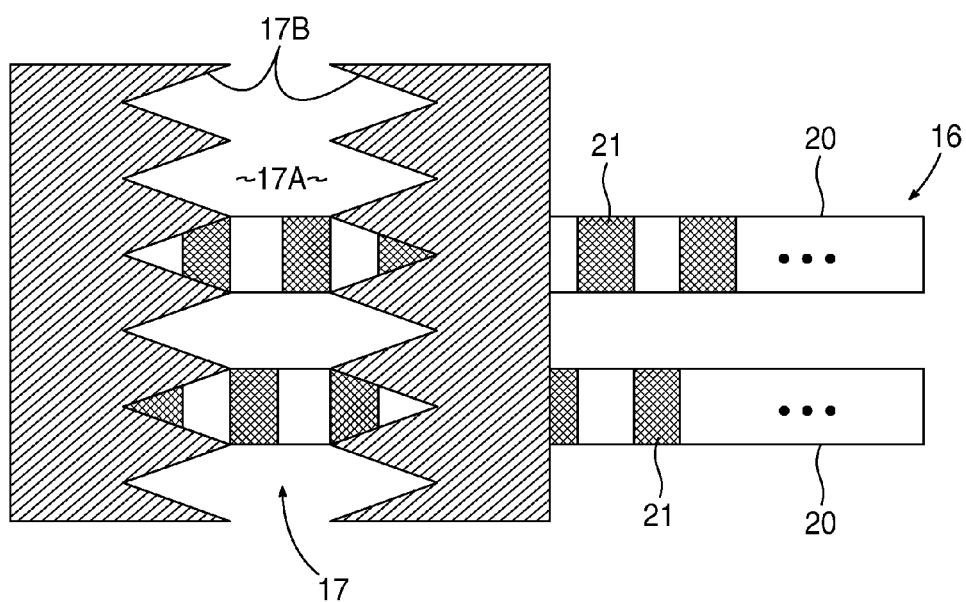
FIG. 8 is a schematic drawing of the operation of another preferred embodiment of an optical sensor.

According to another inventive idea, detection uncertainties and irregularities may be eliminated by the multiplication of strip-boundary transitions 23 instead of their stretching. This preferred embodiment comprises an optical imaging means 17 forming at least four strip-boundary transitions 23 along the detection line(s). One possible embodiment consists of the application of two or more parallel pixel lines under one slot in such a way that the edge of the light strip boundary never falls onto pixels in all of the pixel lines. To this effect, the pixel lines 20 are arranged so that in the direction of the light strip the pixels 21 of one of the pixel lines 20 overlap the gaps of the other pixel line 20. The pixel lines 20 are preferably arranged to each other with an offset in the direction of the light strip, the offset being the half of the period-distance of the pixels 21. One example of such an embodiment is shown in FIG. 8, which is the same as FIG. 4 except for the addition of the second pixel line 20 offset from the first pixel line 20.

In an alternative embodiment, two or more projection devices, slots may be applied parallel to each other in such a way that the strip-boundary transitions 23 of the formed light strips cannot all fall upon gaps at the same time.

The optical imaging means 17 according to the invention is preferably a slot or a cylindrical lens focusing the light of the light source 11 onto a place outside the plane of the line-sensor 16—and thereby effectuating an increase of the dimension of the strip-boundary transition 23.

Of course, the preferred embodiments of the invention may be combined with each other in any arbitrary way.

The advantages of the solutions according to the invention are the following:

By means of a low resolution, i.e. inexpensive line-sensor 16 high accuracy may be achieved, which so far had only been rendered possible by high resolution, i.e. expensive line-sensors.

Low resolution sensors refresh at a higher frequency, increasing the speed of position detection, and reducing its reaction time. It is another advantage of higher frequency, that the background can be measured more frequently, thereby reducing sensitivity to surrounding disturbing lights.

Lower resolution sensors are also reduced in their physical size, therefore more ergonomic products can be manufactured, in wider fields of application.

Lower resolution sensors require lower intelligence electronics, further decreasing the costs.

Due to the lower number of pixels, lower frequency signals are transmitted in the cables, which can be taken further and are less sensitive to electronic noise.

Due to the high detection speed of the line-sensors 16 it is possible that if more light sources are needed to be detected, then these can be flashed in a succession one after the other, therefore they can be safely separated from each other, and identified. The system can be made insensitive to surround light or reflecting light, as the much greater speed allows for turning all the lights off once in each period, and the background light is then measured in respect of each and every pixel of the sensors. Glistening (e.g. reflection from a surface) caused by the light source can be filtered in the way as demonstrated in FIG. 7, by averaging the periphery of above-threshold brightness of the brightest pixel; as reflecting lights are at all times darker than the original light. Should the sensing curves created by the light source and the reflecting light abut, there may be a need to analyze the illumination power curve yielded by the sensor.

The use of optical sensors according to the present invention will fulfill the high requirements set for systems for determining spatial placement, such as low cost, high accuracy, high precision, high resolution position determination, simple to install, high refresh rate of position, low reaction time.

Of course, the invention is not limited to the exemplary preferred embodiments demonstrated in the drawings, but allows for further alterations and modifications within the scope of the invention defined by the claims.

As per the invention, light source shall have its widest meaning and shall not only refer to conventional light sources, but also to any element emitting an optically detectable signal, e.g. an element reflecting a light spot.

The invention claimed is:

1. An optical sensor for detecting a signal emitted by a light source, for use in a placement detection system, the optical sensor comprising:
a line-sensor having a detection line comprising a pixel line consisting of pixels,
an optical imaging means imaging the light of the light source onto a light strip being cross-directional to the detection line of the line-sensor, the optical imaging means being arranged with a distance from the line-sensor, the light strip having strip-boundary transitions on each of its two edges in the direction of the detection line,
wherein the detection line comprises a pixel line, in which there are gaps between adjacent pixels,
the optical sensor has a detection range ensuring that at least one of the strip-boundary transitions always falls at least in part onto a pixel, and the optical imaging means increasing-in the direction of the detection line-the dimension of the strip-boundary transitions.

2. The optical sensor according to claim 1, wherein the optical imaging means is a slot defining rims that are non-linear, wherein the rims also comprise a range ensuring intermediate light transmission.

3. The optical sensor according to claim 2, wherein the range of the rims ensuring intermediate light transmission is formed as a zig-zag rim shape.

4. The optical sensor according to claim 3, wherein in the direction perpendicular to the detection line, a period-length of the zig-zag rim shape is chosen in such a way that at least one dimension of the pixels is identical therewith, or is an integer multiplication thereof.

5. The optical sensor according to claim 3, wherein in the direction of the detection line, the zig-zag rim shape extends at least over a period-distance of the pixels and gaps.

6. The optical sensor according to claim 3, wherein the zig-zag rim shape is a sawtooth shape.

7. The optical sensor according to claim 1, wherein the light strip is projected by the optical imaging means to close an angle other than 90° with the detection line.

8. The optical sensor according to claim 1, wherein the optical imaging means comprises a matted light transmission surface.

9. The optical sensor according to claim 1, wherein the light source is defined by a point light source in the form of a LED.

10. An optical sensor for detecting a signal emitted by a light source, for use in a placement detection system, the optical sensor comprising:
   a line-sensor having a detection line comprising a pixel line consisting of pixels,
   an optical imaging means imaging the light of the light source onto a light strip being cross-directional to the detection line of the line-sensor, the optical imaging means being arranged with a distance from the line-sensor, the light strip having strip-boundary transitions on each of its two edges in the direction of the detection line,
   wherein the detection line comprises a pixel line, in which there are gaps between adjacent pixels,
   the optical sensor has a detection range ensuring that at least one of the strip-boundary transitions always falls at least in part onto a pixel, and
   the optical imaging means creating at least four strip-boundary transitions along the detection line.

11. The optical sensor according to claim 10, wherein the detection line comprises at least two parallel pixel lines with gaps between adjacent pixels, arranged so that-in the direction of the light strip-the pixels of one of the pixel lines overlap the gaps of the other pixel line.

12. The optical sensor according to claim 11, wherein the pixel lines are arranged to each other with an offset in the direction of the light strip, the offset being half of a period-distance of the pixels and gaps.

13. The optical sensor according to claim 10, comprising at least two optical imaging means, arranged parallel to each other.

14. The optical sensor according to claim 10, wherein the optical imaging means is a slot, or a cylindrical lens focusing the light of the light source onto a place outside a plane of the line-sensor.

15. The optical sensor according to claim 10, wherein the light source is defined by a point light source in the form of a LED.

\* \* \* \* \*